(12) United States Patent
Wehrmann et al.

(10) Patent No.: US 6,584,714 B1
(45) Date of Patent: Jul. 1, 2003

(54) FLUORESCENT, STRUCTURED SHAPED BODIES

(75) Inventors: Rolf Wehrmann, Krefeld (DE); Helmut-Werner Heuer, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/831,852

(22) PCT Filed: Nov. 8, 1999

(86) PCT No.: PCT/EP99/08547
§ 371 (c)(1),
(2), (4) Date: May 15, 2001

(87) PCT Pub. No.: WO00/29785
PCT Pub. Date: May 25, 2000

(30) Foreign Application Priority Data

Nov. 18, 1998 (DE) .......................... 198 53 106

(51) Int. Cl.⁷ .................. G09F 13/18; G09F 13/20; G09F 13/00
(52) U.S. Cl. .................. 40/546; 40/542; 40/581
(58) Field of Search .................. 40/546, 542, 543, 40/547, 559, 581, 582

(56) References Cited

U.S. PATENT DOCUMENTS

| | | | |
|---|---|---|---|
| 4,424,449 A | * 1/1984 | O'Brill | 40/542 |
| 4,526,705 A | 7/1985 | Arndt et al. | 252/301 |
| 4,764,622 A | 8/1988 | Claussen et al. | 548/159 |
| 4,890,201 A | * 12/1989 | Toft | 40/546 |
| 4,989,956 A | * 2/1991 | Wu et al. | 40/546 |
| 5,536,558 A | * 7/1996 | Shelton | 40/541 |
| 5,585,160 A | * 12/1996 | Osthassel | 40/539 |
| 5,606,634 A | * 2/1997 | LeBihan | 40/547 |
| 5,678,917 A | * 10/1997 | Bergkvist | 40/543 |

FOREIGN PATENT DOCUMENTS

WO 92/09909 6/1992

OTHER PUBLICATIONS

LUCOLEDs (Luminescent Conversion LEDs) "Die weisse LED ist da" [white LEDs have arrived] Fraunhofer institute fur Angewantdte Festkorperphysik in elektronik industrie 6, 1997, "NICHIA Chemical Develops Efficient White LED Lamp", N. S. Shinbun in Supplement to Technical Newsletter, 10 Ref. No. 21, 1996.

* cited by examiner

Primary Examiner—S. Joseph Morano
Assistant Examiner—Jason R. Bellinger
(74) Attorney, Agent, or Firm—Joseph C. Gil; Aron Preis

(57) ABSTRACT

Optical display containing one or more shaped articles and a light source. The shaped articles consist of a transparent or semitransparent plastic. The plastic contains one or more fluorescent substances. One or more light sources are arranged in such a way that their light is applied to the surface of the shaped article at particular regions of it and propagates through the shaped article. The shaped article contains means for controlled light output, so that the light can be output from the shaped article in a controlled way at quite particular regions on the surface of the shaped article.

12 Claims, 4 Drawing Sheets

FLUORESCENT, STRUCTURED SHAPED BODIES

The invention relates to an optical display for the rendition of pictorial representations, colour patterns or items of information. The pictorial representations, colour patterns or items of information are rendered by optically exciting fluorescent substances in a transparent or semitransparent shaped plastic article which is provided with means for controlled light output.

Shaped articles made of transparent or semitransparent plastics, which are dyed using fluorescent substances, are known (EP 0 025 136 and EP 0 032 670). They are, for example, used for objects of furniture or decoration. The light is applied flat to such known shaped articles using an external source. The fluorescent light becomes visible at the edges of the shaped articles. The light source used in this case is ambient light from lamps or sunlight. These known shaped articles have no internal structuring or surface structuring and are not used for the rendition of pictorial representations, colour patterns or items of information.

Recently, fluorescent substances have been used to coat blue light-emitting diodes in order, by means of luminescent conversion, to produce white light or light of any other desired colour. Such light-emitting diodes are referred to as LUCOLEDs (Luminescent Conversion LEDs) "Die weiβe LED ist da" [white LEDs have arrived] Fraunhofer Institut für Angewandte Festkörperphysik in elektronik industrie 6, 1997, "NICHIA CHEMICAL Develops Efficient White LED Lamp", N. S. Shinbun in Supplement to TECHNICAL NEWSLETTER, 10, Ref. No. 21, 1996). Here again, there is no structuring of the coating containing the fluorescent substances.

The object of the present invention is to use the fluorescent emission from shaped articles made of transparent or semitransparent plastics, which contain fluorescent substances, in combination with the waveguide properties of the shaped articles, in particular for the pictorial representation and rendition of colour patterns or items of information.

The invention relates to an optical display containing one or more shaped articles and a light source. The term shaped articles includes articles configured in any way, for example sheets, plates, ropes, threads, fibres, tubes, spheres, cuboids, cylinders, hollow bodies or rings. The shaped articles consist of one or more transparent or semitransparent plastics. Each plastic contains one or more fluorescent substances. One or more light sources are arranged in such a way that their light is applied to the surface of the shaped article at particular regions of it and propagates through the shaped article. The shaped article contains means for controlled light output, so that the light is output from the shaped article in a controlled way at quite particular regions on the surface of the shaped article.

The light input into the shaped article, usually visible light or UV light, is absorbed through excitation of the fluorescent substances in the shaped article. The fluorescent light emitted by the fluorescent substances has a longer wavelength than the light originally input. The shaped article acts as an optical waveguide for the fluorescent light. Total reflection of a major part of the light takes place at the walls of the shaped article.

Examples of possible means for the scattering of light include structuring in the interior of the shaped article (internal structure), structuring of its surface or a light-scattering layer on particular regions of the surface of the shaped article.

The internal structuring of the shaped article, the structuring of the surface or the coating of the surface with a light-scattering layer, causes scattering of the fluorescent light in the shaped article, so that it no longer strikes the inner walls of the shaped article at the correct angle for total reflection. This causes the scattered light to be output. The regions on the surface of the shaped article where the fluorescent light is radiated are defined by the structuring, that is to say controlled output is involved. Through appropriate structuring, it is possible for the fluorescent light to be radiated, for example, in the form of pictorial figures, characters or patterns.

The shaped article consists of a transparent or semitransparent plastic, such as thermoplastic, elastomer or thermoset, in which the fluorescent substances are incorporated. Examples of particularly suitable transparent plastics include polycarbonates, polyesters, polyacrylates, polystyrenes, polyvinyl polymers, copolymers of styrene and acrylates, polyacrylonitrile, polysulphones, polyether sulphones, cyclic polyolefins and copolymers and cellulose acetates. Further examples of suitable plastics can be found in H. Domininghaus, "Die Kunststoffe und ihre Eigenschaften" [plastics and their properties] 4th edition 1992 VDI Verlag, Dusseldorf and "Encyclopaedia of Polymer Science and Engineering", 2nd edition J. Wiley & Sons, New York or J. Brandrup, E. H. Immergut, "Polymer Handbook", $3^{rd}$ edition, J. Wiley & Sons, New York.

According to the invention, suitable fluorescent substances include all low molecular weight, oligomeric and polymeric substances which exhibit photofluorescence. Examples of low molecular weight substances include organic fluorescent and laser dyes such as coumarins, perylenes, phthalocyanines, stilbenes and distilbenes, distyrenes, methines, azomethines, phenanthrenes, rubrene, quinacridones or optical brighteners based on heterocyclic compounds. Photofluorescent metal and transition metal complexes such as aluminium oxinate, europium complexes, boron chelates or gallium chelates may furthermore be used. For example, poly(para-phenylene vinylene) (PPV) and PPP derivatives such as methoxy-ethylhexyl-oxy PPV (MEH-PPV) are suitable as polymeric fluorescent materials. Polymers with fluorescent segments in the main or side chain may also be used. Various fluorescent substances with different absorption and emission spectra may also be contained in a shaped article.

The internal structuring may consist of light-scattering particles such as glass spheres, glass fibres, metal oxides, $SiO_2$ or minerals, which are incorporated in the shaped article. The particles act as scattering centres for the incident fluorescent light and deviate it in such a way that it strikes the surface of the shaped article at a steep angle and does not undergo total reflection but is instead output. The same effect can be obtained from gas inclusions in the shaped article, which form, inside the shaped article, interfaces at which the incident light is scattered. The particles may themselves also contain fluorescent substances.

Structuring of the surface of the shaped article may consist of light-scattering particles which are incorporated in the surface of the shaped article. The particles act as scattering centres on the surface and output the incident light.

The surface may also be structured using grooves and/or holes. With this type of surface structuring, the scattering centres are created on the surface of the shaped article. The edges of grooves formed in the shaped article may be chamfered.

Printing pastes—for example screen printable formulations or blends or dyes—which are applied using known methods, may be used as a light-scattering layer on particular regions of the surface of the shaped article. At points on the surface which are coated in this way, the incident light is not reflected corresponding to the angle of incidence, but is scattered back into the shaped article. It then strikes the opposite surface of the shaped article at angles which do not allow total reflection, and is output there.

At regions on the surface where no light is output, the shaped article may be coated with a reflecting material, for example a metal layer of aluminium, gold or silver or with another layer having a refractive index which permits total reflection. A coating which is nontransparent over its entire surface is also possible. These reflecting layers improve the waveguide properties, at the points which are not structured or scatter light, and increase the strength of the internal radiation field in the shaped article. This leads to increased intensity of the output light.

In order to produce the shaped articles with fluorescent substances, the fluorescent substances are firstly incorporated in the transparent or semitransparent plastics. The incorporation is carried out using known methods, such as compounding or by co-dissolving the fluorescent substances with the polymer material and subsequent evaporation.

The shaped articles are produced from the plastics containing the fluorescent substances using known methods such as, for example injection moulding or extrusion. Sheets can also be produced from solvents by casting or other known coating methods. It is also possible to use laminates made of a substrate and a sheet that contains the fluorescent materials.

It is also possible to apply solutions of fluorescent substances and the plastic to a suitable base by measures such as casting, printing and spraying.

For internal structuring by the incorporation of particles, such as glass spheres or glass fibres, metal oxides, $SiO_2$ or minerals, the conventional methods of providing additives to plastics are used, for example compounding. For internal structuring by glass inclusions, the customary methods which are employed, for example in foam production are resorted to.

For structuring the surface of the shaped articles with light-scattering particles, in a first step the particles are suspended in a solvent, which dissolves the material of the shaped article, and is applied to the surface of the shaped article using mechanical aids or devices such as, for example, a die or a printing machine. In this case, the regions where the particles and the solvent touch the surface swell. The solvent is then allowed to evaporated. To that end, the shaped article may be heated until the solvent has fully evaporated.

The structuring of the surface of the shaped articles may also be carried out by grinding, scratching, scraping, sawing, drilling, graining, stamping, laser abrasion, matrix printing or other mechanical methods which cause local deformation or alteration of the surface. It may also be structured chemically by etching using a solvent.

The optical display may contain a plurality of shaped articles. The individual shaped articles may, for example, be connected together by adhesive bonding or mechanical devices such as mounts, frames or screw fastenings.

In general, light-emitting radiation sources which are suitable for optical excitation of the fluorescent material in the shaped article and therefore stimulate the visible fluorescent emission, are suitable as the light source. Radiation sources which—unlike sunlight—have a defined emission wavelength, such as lasers or laser diodes, light-emitting diodes (LEDs), UV lamps or electroluminescent radiation sources, are especially suitable. Inorganic LEDs, UV lamps and electroluminescent radiation sources are preferred. If an electroluminescent component is used as the radiation source, it may be an organic or inorganic emitter.

In order to input the light into the shaped article, the light source may be in direct contact with the shaped article. In order to produce direct contact, the light source may be adhesively bonded to the shaped article, fused onto or into it, pressed on or fitted into bores. The light source may also be in indirect contact with the shaped article but illuminate it only in a locally limited way.

It is also possible to use different light sources at the same time, for example LEDs with different emission wavelengths, for photochemical excitation of the fluorescent substances. If, in addition, different fluorescent substances are used, then it is possible through appropriate choice of the illuminating light source, to stimulate the various fluorescent substances selectively or in common and in this way to produce and output visible light of differing wavelength.

The optical display is used for the rendition of pictorial representations, colour patterns or items of information. The structuring for this is carried out in such a way that the surfaces or regions radiating the fluorescent light form patterns, words, numerals, symbols or other signs. Through the use of fluorescent substances with differing emission spectrum, but overlapping absorption spectrum and localizing the various fluorescent substances at different points on the shaped article, it is possible to represent items of information in various colours at the same time using a narrow-band light source, for example for a single LED.

When using a plurality of excitation light sources which differ in terms of their wavelengths in the optical display, and fluorescent substances which vary in terms of their emission spectra, different pictorial representations or items of information with a variety of colours can be presented successively or at the same time.

Possible uses of the optical display according to the invention include display elements or display units of control panels, dashboards or instrument panels of motor vehicles or other means of transport, which are used for visualization and the presentation of information, switchback-illumination or lights in vehicles or on bicycles.

Other possible applications include back-lighting or lighting units or lamps (designer lighting), interior furnishings, pieces of furniture, picture frames, shelves, promotional articles, light rods or light balls, household goods, a children's toy, desk accessories, ornaments, "knick-knacks" or other objects of daily use.

Other possible uses include traffic signs (for example a stop sign), road signs, information displays (such as emergency exit signs), advertising structures, partitions (for example for setting up exhibitions), publicity signs, illustrated charts and warning signs.

If the shaped articles are used as ropes or fibres, they may also be employed as light-guide systems (POFs: polymeric optical fibres).

Figure 1A:
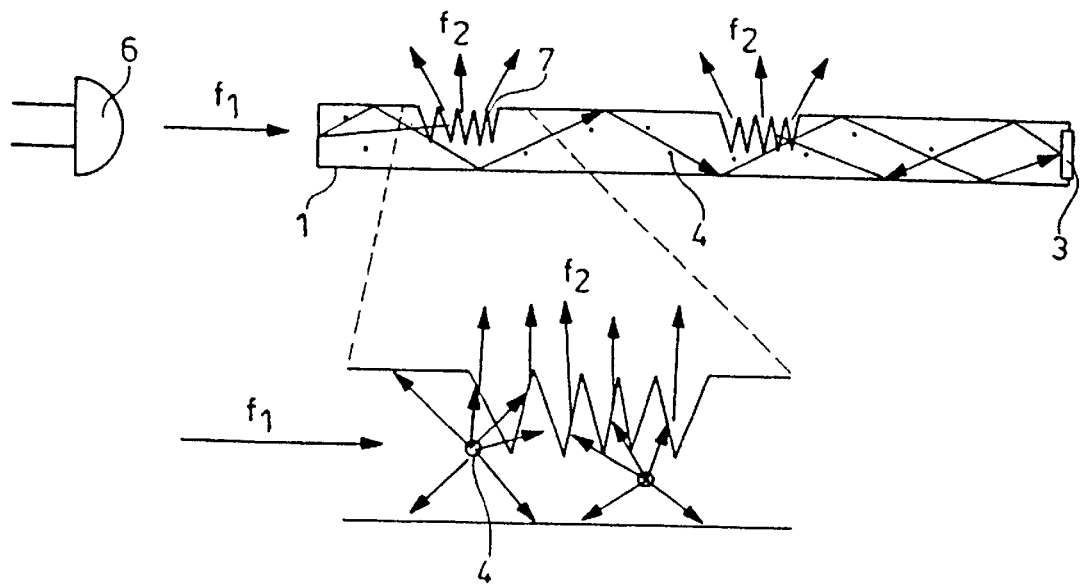
FIG. 1 shows the waveguiding in a shaped article structured by matrix printing.
Figure 2A:
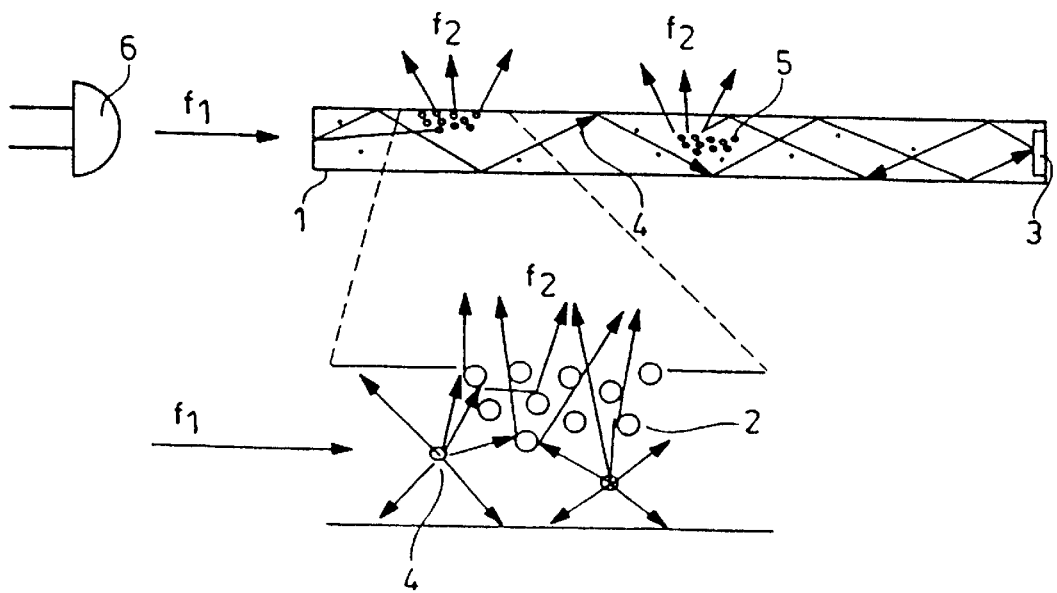
FIG. 2 shows the waveguiding in a shaped article structured using particles.

FIGS. 1 and 2 show the waveguiding in a shaped article 1 which is structured and mirrored on one edge 3, and contains fluorescent substances 4, and 7 denotes grooves. Using a radiation source 6, blue light of wavelength $f_1$ is applied to a narrow side of the cuboid shaped article 1, which is represented in side view. This light excites the fluorescent substances 4 which, for their part, emit fluorescent light of wavelength $f_2$. In FIG. 1, the fluorescent light is scattered at mechanically structured regions on the surface 2, so that it is no longer reflected in the shaped article 1, but is radiated from the surface of the shaped article. In FIG. 2, the fluorescent light is reflected at particles 2 which are embedded in the surface of the shaped article and particles 5 which are located in the interior of the shaped article, so that it is no longer reflected back in the shaped article 1 but is radiated from the surface of the shaped article.

EXAMPLE 1

Platelets of size 20×30×3 mm$^3$ were produced by injection moulding from the plastics listed in Table 1, which contained the fluorescent substances indicated in Table 1.

TABLE 1

| Plastic | Fluorescent substances |
|---|---|
| Polystyrene | 0.01 and 0.05% Dye1 |
| Polystyrene | 0.0497% Dye1 with 0.0003 Dye2 |
| Polystyrene | 0.01 and 0.05% Dye2 |
| Polycarbonate | 0.01 and 0.05% Dye2 |
| Polymethyl methacrylate | 0.01 and 0.05% Dye2 |
| Polyethylene terephthalate | 0.01 and 0.05% Dye2 |
| Styrene-acrylonitrile | 0.01 and 0.05% Dye2 |

Dye1: Macrolex Fluorescent Yellow 10 GN, Bayer AG, Leverkusen
Dye2: Macrolex Fluorescent Red G, Bayer AG, Leverkusen Under illumination with a UV lamp (wavelength 366 or 254 nm) or a blue LED (RS 235-9900, type: ultra bright blue (954172)) all the platelets had a surface which uniformly radiated a weak fluorescent light. Light did not emerge preferentially from any point on the surface.

The surfaces were then processed using a matrix printer. In the region of space around the notches or indentations which had been embossed by the matrix printer, light then preferentially emerged under illumination with the UV lamp (wavelength 366 or 254 nm) or a blue LED (RS 235-9900, type: ultra bright blue (954172)), so that higher light intensity was visually observed compared with the smooth neighbouring regions.

EXAMPLE 2

A suspension of glass spheres 21 having a diameter of 50–210 μm in methylene chloride as solvent was applied to a polycarbonate-injection moulded piece according to Table 1 with 0.05% Dye2, in areas of a few mm$^2$ using a die. The solvent then swelled the surface to be structured. The glass spheres therefore penetrated into the surface and remained firmly bound after the solvent had evaporated. They acted as scattering centres under illumination with the UV lamp (wavelength 366 or 254 nm) or a blue LED (RS 235-9900, type: ultra bright blue (954172)). Fluorescent light was output in a controlled way at them and bright spots appeared on a surface which itself gave weak illumination.

EXAMPLE 3

Figure 3:
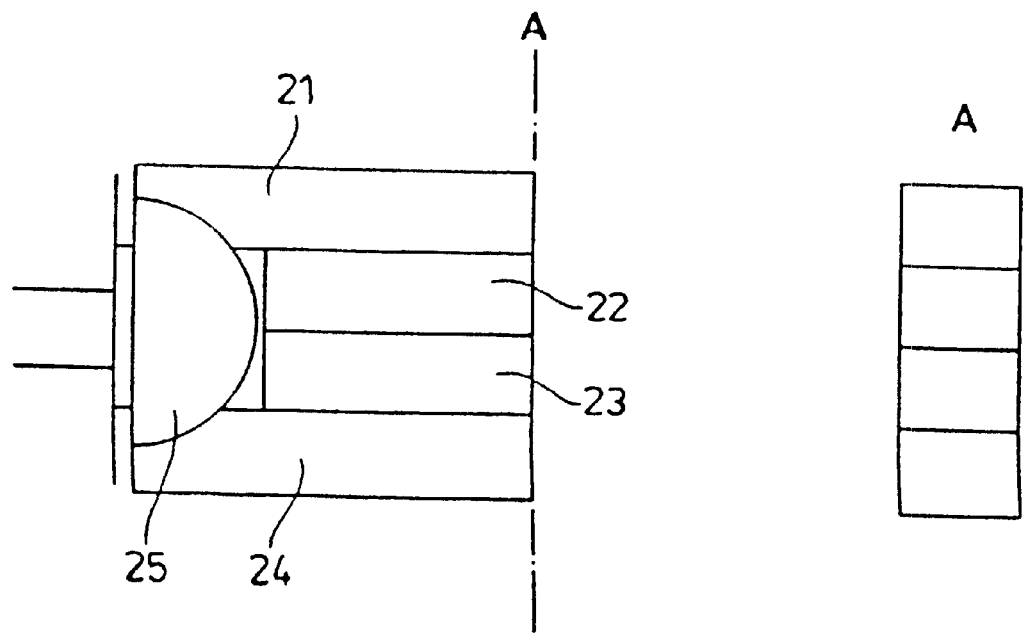
FIG. 3 shows an optical display having a plurality of shaped articles.

Optical display having four stacked shaped articles 21, 22, 23, 24 of polycarbonate sheets with a thickness of 0.75 mm, each having a blue, green, red and yellow fluorescent dye were produced (FIG. 3). All the plates had the same width and thickness. The middle two plates were shorter than the outer two plates. The ends of the shaped articles are structured at their surface. The light source 25, a blue LED (RS 235-9900, type: ultra bright blue (954172)), were fitted into the indentation between the outer two plates and were partially sunk into the bored outer plates. This being the case, it touched the outer two plates directly, while it illuminated the inner two plates only on their narrow side. On side A, where the four plates ended flush with one another, the coloured emissions in strips corresponding to the structured end faces of the shaped articles and the fluorescent dyes respectively contained, could only be seen clearly when the LED was turned on to excite the emission by the various fluorescent dyes.

EXAMPLE 4

A blue LED (RS 235-9900, type: ultra bright blue (954172) was shone on the origin side into a conically shaped injection-moulded polycarbonate article which contains a blue fluorescent dye. The opposite side to the origin side was formed by breaking off an originally longer injection-moulded article, and was therefore uniformly roughened. Intense widely spread light emission emerged on the roughened side, while no light emerged on the lateral surfaces of the conical article.

EXAMPLE 5

A square was cut out in a polycarbonate plate containing the fluorescent dye Makrolex 10 GN. The sawed inner edge is uniformly roughened. After applying a blue LED (RS 235-9900, type: ultra bright blue (954172)) to the outside, intensified light output (emission) could be registered on the inner edge in the square cut out from the inside.

EXAMPLE 6

Figure 4:
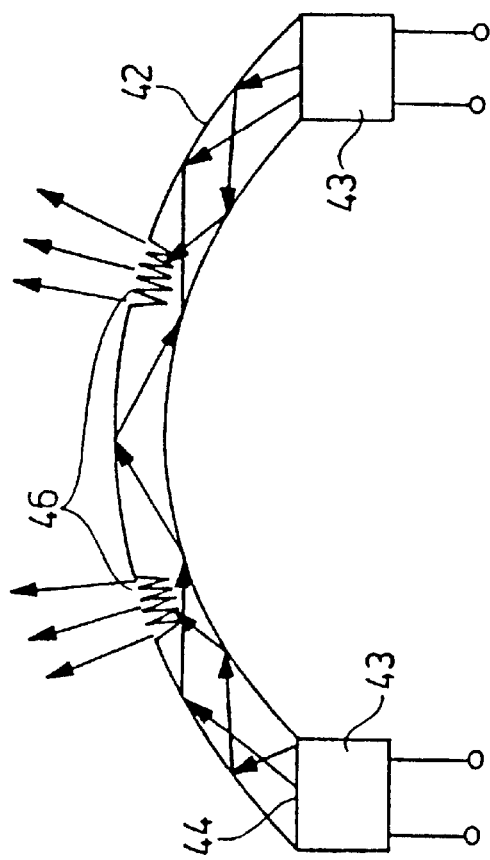
FIG. 4 shows two embodiments of optical displays.
Figure 4:
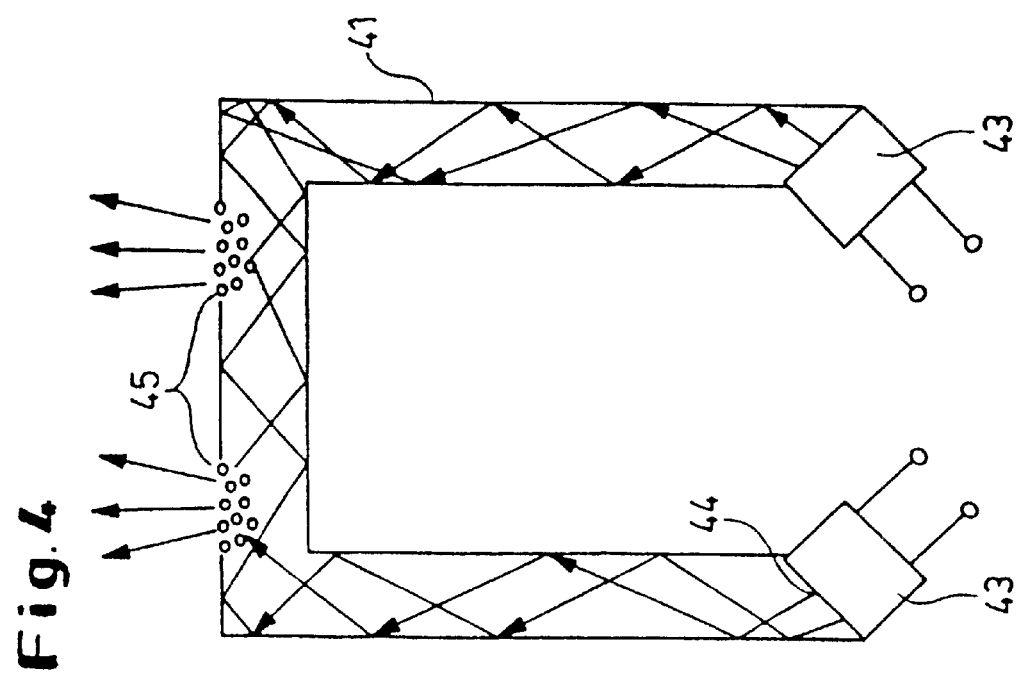

FIG. 4 shows two embodiments of optical displays, consisting of a shaped article 41 and 42, respectively, according to the invention and two radiation sources 43. The shaped article is very long compared with its illuminated cross section 44, and describes a rectangular frame, and a section of an elliptical curve, respectively. The shaped article, which was illuminated at its two ends using two blue light-emitting diodes 43, was structured at a few points on its surface 45 and 46, respectively, so that the fluorescent light emerged at these points.

EXAMPLE 7

Figure 5:
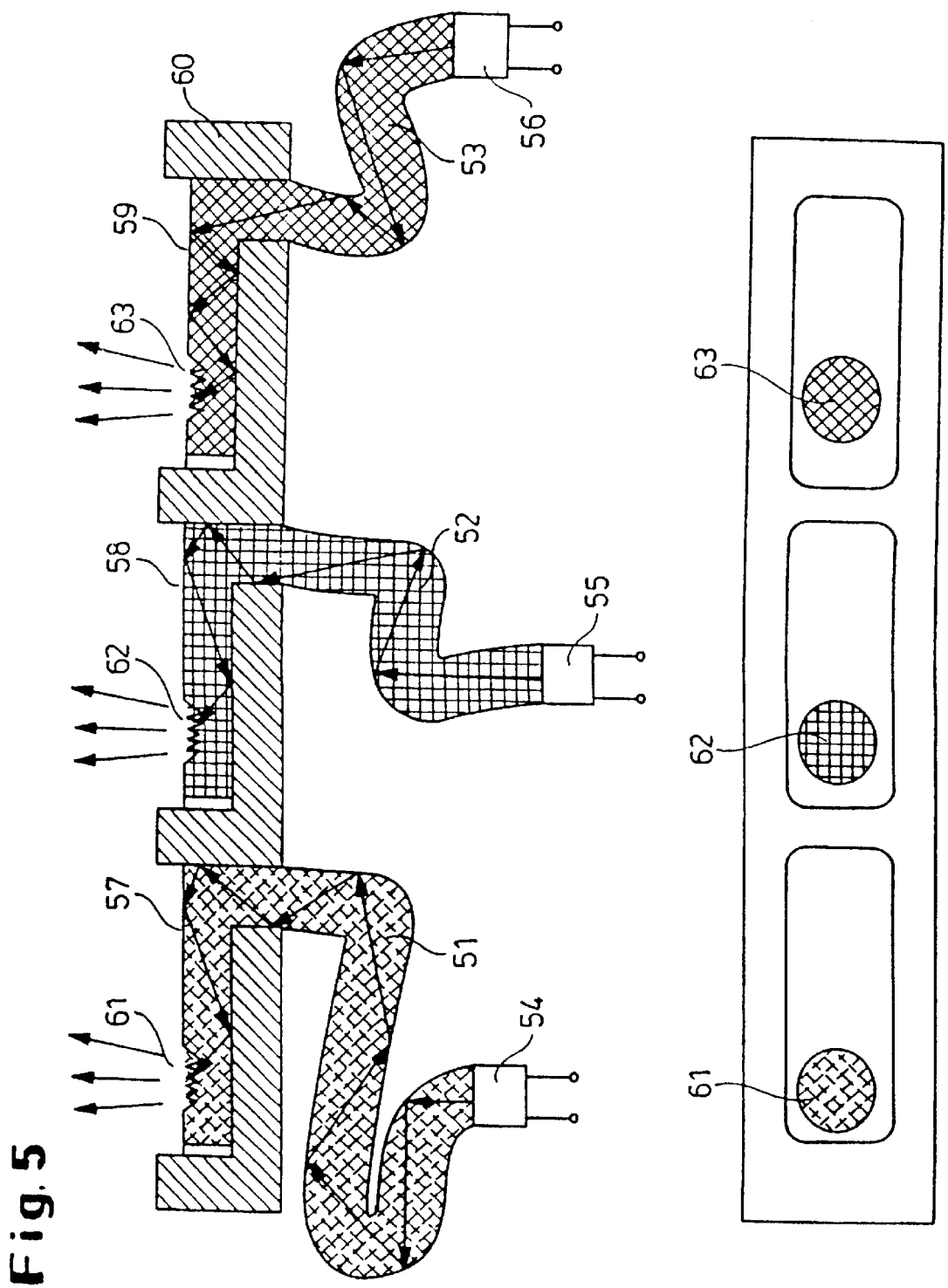
FIG. 5 shows optical displays having a plurality of shaped articles with radiation of fluorescent light in different colours.

FIG. 5 shows an optical display made of three shaped articles 51, 52, 53, with different fluorescent substances in each case, which were illuminated from one end by three light-emitting diodes 54, 55, 56 having different emission wavelengths. The unilluminated ends of the shaped articles 57, 58, 59 are arranged next to one another in a support 60, in such a way that an observer only sees the ends of the shaped articles, but not the illuminated light source. A part of the shaped article surface 61, 62, 63 is structured at the unilluminated end region. At the structured points 61, 62, 63, coloured light corresponding to the fluorescent substance emerges in each case, as can be seen from the plan view in FIG. 5 at the bottom.

What is claimed is:
1. An optical display made of at least one shaped article having a surface which article consists of one or more transparent or semitransparent plastics and contains one or more fluorescent substances, characterized in that the shaped article has means for controlled light output and one or more light sources that are arranged in such a way that their light input into the shaped article at particular regions of its surface, propagates through the shaped article and re-emerges at quite particular other regions of the surface of the shaped article, which are established by means for controlled light output, with a wavelength longer than that of the light input.

2. The optical display according to claim 1, characterized in that internal structuring, the structuring of the surface or a light-scattering layer on the surface are used as the means for controlling the light output.

3. The optical display according to claim 2, characterized in that the internal structure or the structuring of the surface is formed by light-scattering particles, such as glass spheres, glass fibres, metal oxides, $SiO_2$, and minerals.

4. The optical display according to claim 3, characterized in that the light-scattering particles contain fluorescent substances.

5. The optical display according to claim 2, characterized in that the light-scattering layer is a printing paste or an ink.

6. The optical display according to claim 2 wherein the surface includes grooves, channels and/or holes.

7. The optical display according to claim 6, characterized in that the edges of the channels are contiguous.

8. The optical display according to claim 1 characterized in that the shaped article is coated with a total-reflection layer at the regions on the surface where there is no light output.

9. The optical display according to claim 1 characterized in that the light source is a light-emitting diode or an electroluminescent unit.

10. The optical display according to claim 1 characterized in having a plurality of light sources that have different emission spectra.

11. An optical display made of at least one shaped article having a surface which article consists of one or more transparent or semitransparent plastics and contains one or more fluorescent substances, means for controlled light output in the form of a structured surface, and one or more light sources that are arranged in such a way that their light input into the shaped article at particular regions of its surface, propagates through the shaped article and re-emerges at quite particular other regions of the surface, which are established by the surface for controlled light output, with a wavelength longer than that of the light input, said surface structured by a process comprising (i) applying and pressing to the surface a suspension of particles in a liquid, and (ii) evaporating the liquid, the liquid being a solvent of the plastics and the pressing carried out by a press die.

12. An optical display made of at least one shaped article having a surface which article consists of one or more transparent or semitransparent plastics and contains one or more fluorescent substances, means for controlled light output in the form of internal structuring, and one or more light sources that are arranged in such a way that their light input into the shaped article at particular regions of its surface, propagates through the shaped article and re-emerges at quite particular other regions of the surface, which are established by the internal structure for controlled light output, with a wavelength longer than that of the light input, said internal structuring formed by gas inclusions.

* * * * *